Patented Apr. 4, 1939

2,152,662

UNITED STATES PATENT OFFICE 2,152,662

METHOD FOR PREPARING RIBOSE

Francis P. Phelps, Washington, D. C., assignor to the Government of The United States, represented by the Secretary of Commerce No Drawing. Application December 31, 1937, Serial No. 182,923

14 Claims. (Cl. 260—209)

(Granted under the act of March 3, 1883, as amended April 30, 1928; 370 O. G. 757)

The invention described herein may be manufactured and used for or by the Government for governmental purposes without the payment to me of any royalty thereon.

The present invention relates to a method of preparing ribose.

It is an object of the present invention to provide an improved method of preparing ribose, wherein the time involved is greatly shortened, the yield increased, and the expense correspondingly reduced. Other objects of the invention will appear more fully from the following specification.

Heretofore, various methods have been used for the preparation of ribose but none have been wholly satisfactory. Consider, for example, the matter of cost. The present catalog list price of ribose is $40.00 per gram. Such high cost has resulted largely from the complicated and time consuming process previously considered necessary to its manufacture and the small yield obtained thereby.

Thus, in the manufacture of ribose from yeast nucleic acid, it has been customary to hydrolyze the nucleic acid in the presence of an excess of ammonia. This results in the formation of soluble ammonium salts of phosphoric acid, as well as ammonium salts of any residual unhydrolyzed nucleic acid, all of which are soluble, and consequently remain in solution. These soluble ammonium compounds, which contain phosphoric acid residuals, seriously interfere with the separation and purification of the gaunosine and adenosine contained in the mixture, and a difficult, tedious and wasteful lead purification process has been found necessary, involving the following additional steps: treatment of the reaction mixture, while hot and in mild acid condition, with normal lead acetate; filtration of the precipitated lead nucleotides; treatment of the filtrate in the cold alternately with basic lead acetate and ammonita so long as lead nucleosides, will precipitate; filtration of the lead nucleosides, which are then washed by suspension in water and filtered followed by suspension in water and decomposition by means of $H_2S$; and concentration in vacuo.

In accordance with the present invention, the necessity for the use of such complicated, expensive, and time consuming processes is overcome by a new process wherein, when the initial alkaline hydrolysis is completed, practically all phosphorus containing compounds have been precipitated out of the solution so that they may be readily filtered as soon as the autoclave can be opened, leaving a mixture of ribosides of such purity that guanosine crystallizes out practically quantitatively upon cooling in contrast to the very low yield heretofore obtained by the use of the aforesaid lead process. Moreover the filtrate from the guanosine is sufficiently pure without further treatment for immediate separation of the adenosine by the addition of picric acid.

In the practice of the present invention, the nucleic acid is first hydrolyzed with an alkaline earth base which forms insoluble compounds with the undesirable hydrolytic products, such as the calcium, barium, strontium and magnesium salts of phosphoric acid and phosphoric acid compounds, thereby resulting in their immediate removal from the reaction mixture. The preferred base is magnesium either in the form of oxide or carbonate.

For purposes of illustration, the following procedure is set forth, which produces highly satisfactory yields, using ordinary laboratory equipment:

Place 50 grams of commercial yeast nucleic acid (which assayed about 83% acid), 80 grams of MgO and 2½ to 3 liters of water, in a 4 liter beaker and mix until a uniform, smooth suspension is obtained, free from lumps. The beaker containing the mixture is put in an autoclave and heated to about 145° C. for 4 hours with continuous stirring.

The maximum working temperature range lies between approximately 120° C. and 155° C. Above the upper temperature, decomposition becomes excessive, while below the lower temperature the reaction proceeds slowly, if at all. The preferable working range lies between 140° C. and 150° C., the best results being obtained at about 145° C.

The stirring operation is of importance, the yield being materially reduced if this step is omitted. This probably is because of the formation of insoluble magnesium nucleotides which if not kept in suspension by stirring, cake upon the bottom of the beaker and the hydrolysis does not proceed properly.

After the 4 hour treatment at 145° C., the autoclave is opened and the reaction mixture containing the 4 ribosides in solution and practically all the phosphates in suspension, is filtered through a large Buchner funnel into a 4 liter filtering flask. The copious precipitate, which consists largely of compounds containing magnesium and phosphorus, is packed down with a large nickel or other spatula and washed with 1 to 1½ liters of boiling water, making a total volume of filtrate and washings of about 3½ to 4 liters.

The filtrate is permitted to stand over night at room temperature, or preferably in an ice box, to permit the guanosine to crystalize out as completely as possible and is then filtered. At this stage, the reaction of the filtrate preferably should be slightly alkaline, about pH 7.5–8.00. An acid reaction indicates that insufficient magnesia was used. It is important that the solution be not allowed to become acid during the hydrolysis, because at the high temperature employed there would be danger of hydrolyzing some of the ribosides which is undesirable at this stage.

After filtering off the guanosine, the adenosine may at once be precipitated by the addition of picric acid, or if preferred, a preliminary treatment may be given to remove the excess magnesia as follows: add while stirring, a solution of about 2 grams of ammonium phosphate followed by dilute $Ba(OH)_2$ solution to about pH 9, or as long as precipitate is formed. The precipitate is filtered off and the solution immediately treated with $H_2SO_4$ and picric acid to precipitate adenosine picrate. This is filtered and washed to free it as far as possible from the acid mother liquor.

Both the guanosine and adenosine picrate obtained from the reaction mixture may be purified if desired by one or two recrystallizations from hot water, using a small amount of decolorizing carbon. The comparatively pure guanosine and adenosine picrate are then hydrolyzed under conditions similar to those used by Levene and Clark (J. Biol. Chem. 46, 19–31 (March 1921)), except that decolorizing carbon is used to replace the undesirable ether precipitations of impurities. In the case of the adenosine picrate, treatment after hydrolysis with decolorizing carbon completely removes all residual adenine picrate, and consequently the ether extraction process of Levene and Clark to remove residual picric acid is unnecessary.

As to the hydrolysis of the guanosine and the separation of the ribose, assume by way of example that 100 grams of recrystalized guanosine is hydrolized for 1 hour at about 100° C. in 10 liters of approximately 0.1 N sulphuric acid. An excess of silver sulphate is then added, and the solution permitted to cool and stand over night at room temperature, or preferably in an ice box at as low a temperature as is practicable, after which the insoluble guanine silver sulphate compound is filtered off.

The $H_2SO_4$ in the solution is then neutralized with $Ba(OH)_2$ to a pH of about 6.4 to 7.0 preferably in two stages, the bulk of the $BaSO_4$ being filtered off while the solution is decidedly acid, since $BaSO_4$ is found to filter more readily in acid than in neutral solution. The small remaining amount of acid is then neutralized, bringing the solution to a pH of 6.4 to 7.0, using brom-thymol-blue, a glass electrode, or some other pH indicator. The small amount of $BaSO_4$ precipitated here is then readily filtered off, if decolorizing carbon is used at this stage, otherwise the fine precipitate is apt to clog the filter and cause slow filtration.

The neutral filtrate is then concentrated under reduced pressure at a low temperature to a rather thick syrup, which is taken up with about 500 cc. of warm absolute alcohol. The flocculent precipitate, if any, is then filtered off with a small amount of decolorizing carbon and the solution again evaporated in vacuo to a thick syrup. This is washed out of the boiling flask into an appropriate beaker by used of a small amount of warm alcohol and seeded with ribose. Crystallization usually starts within a few minutes. When crystallization appears complete, the ribose is filtered off and another crop obtained by working up the mother liquor.

As to the hydrolysis of the adenosine picrate and the separation of the ribose, assume, by way of example, 150 grams of the recrystallized adenosine picrate is dissolved in 10 liters of boiling water. When the solution is complete, about 70 grams of $H_2SO_4$ is added and the solution hydrolyzed at about 100° C. for one hour. The solution is then permitted to cool and stand overnight at room temperature, or preferably in an ice box, in order that the insoluble adenine picrate may crystalize out as completely as possible. The adenine picrate is filtered off, leaving a pale yellow filtrate. This yellow color, caused by the residual adenine picrate, may be completely removed at this stage by filtration through decolorizing carbon. However, it is usually preferable to apply this step during the removal of the barium sulphate. In that case, the $H_2SO_4$ contained in the yellow solution is neutralized, usually in two steps exactly as described above for the guanosine, the filtration in each case being made through a mat of decolorizing carbon on the Buchner funnel. From this stage on the procedure is exactly the same as that described above for the guanosine.

The invention may be further modified and embodied within the scope of the subjoined claims.

I claim:

1. A step in the method of preparing ribose which consists in treating nucleic acid with an alkaline earth base capable of forming an insoluble compound with phosphoric acid.

2. The method for effecting the hydrolysis of nucleic acid and the partial purification of the hydrolyzed material, which consists in heating a mixture of nucleic acid and an alkaline earth base.

3. The method which consists in treating nucleic acid with a magnesium compound capable of combining with phosphoric acid to form an insoluble compound.

4. The method for effecting the hydrolysis of nucleic acid and the partial purification of the hydrolyzed material, which consists in treating nucleic acid with a magnesium compound capable of neutralizing the phosphoric compounds freed by the hydrolysis, the resulting phosphoric salt being insoluble.

5. The method which consists in heating nucleic acid with a magnesium compound capable of combining with phosphoric acid to form an insoluble compound, said magnesium compound being also capable of maintaining the reaction mixture substantially in an alkaline condition.

6. The method which consists in heating nucleic acid with magnesia in the presence of water.

7. The method which consists in heating nucleic acid with a magnesium compound capable of causing the separation of the phosphorus-containing compounds from the water-soluble riboside mixture, and then separating individual ribosides from said water-soluble mixture.

8. The method which consists in heating nucleic acid with a compound of a base forming element, of which the phosphoric acid salt is insoluble and may be separated from the water-soluble riboside mixture, then separating individual ribosides from said water-soluble mixture, and hydrolyzing said individual ribosides, the residual impurities being then removed by decolorizing carbon.

9. The method which consists in heating nucleic acid with a compound of a base forming element, of which the phosphoric salt is insoluble and may be separated from the water-soluble riboside mixture, and then separating the individual riboside guanosine from the water-soluble mixture.

10. The method which consists in heating nucleic acid with a compound of a base forming element, of which the phosphoric acid salt is insoluble and may be separated from the water-soluble riboside mixture, and then separating the individual riboside adenosine from the water-soluble mixture.

11. The method which consists in heating nucleic acid with a magnesium compound capable of causing the separation of the phosphorus-containing compounds, separating the individual riboside guanosine, and then separating the individual riboside adenosine.

12. The process which consists in treating a solution containing adenine picrate with decolorizing carbon to remove the adenine picrate from the solution.

13. A step in the preparation of ribose which consists in treating a solution containing ribose and adenine picrate with decolorizing carbon for the purpose of removing the adenine picrate from the solution.

14. The process of purifying solutions containing ribosides which consists in treating such solution with decolorizing carbon to remove impurities.

FRANCIS P. PHELPS.

CERTIFICATE OF CORRECTION.

Patent No. 2,152,662. April 4, 1939.

FRANCIS P. PHELPS.

It is hereby certified that error appears in the printed specification of the above numbered patent requiring correction as follows: Page 1, first column, lines 41 and 42, for "ammonita" read ammonia; and second column, line 23, for "50" read 500; and that the said Letters Patent should be read with this correction therein that the same may conform to the record of the case in the Patent Office.

Signed and sealed this 6th day of June, A. D. 1939.

Henry Van Arsdale
Acting Commissioner of Patents.

(Seal)

residual impurities being then removed by decolorizing carbon.

9. The method which consists in heating nucleic acid with a compound of a base forming element, of which the phosphoric salt is insoluble and may be separated from the water-soluble riboside mixture, and then separating the individual riboside guanosine from the water-soluble mixture.

10. The method which consists in heating nucleic acid with a compound of a base forming element, of which the phosphoric acid salt is insoluble and may be separated from the water-soluble riboside mixture, and then separating the individual riboside adenosine from the water-soluble mixture.

11. The method which consists in heating nucleic acid with a magnesium compound capable of causing the separation of the phosphorus-containing compounds, separating the individual riboside guanosine, and then separating the individual riboside adenosine.

12. The process which consists in treating a solution containing adenine picrate with decolorizing carbon to remove the adenine picrate from the solution.

13. A step in the preparation of ribose which consists in treating a solution containing ribose and adenine picrate with decolorizing carbon for the purpose of removing the adenine picrate from the solution.

14. The process of purifying solutions containing ribosides which consists in treating such solution with decolorizing carbon to remove impurities.

FRANCIS P. PHELPS.

---

CERTIFICATE OF CORRECTION.

Patent No. 2,152,662.     April 4, 1939.

FRANCIS P. PHELPS.

It is hereby certified that error appears in the printed specification of the above numbered patent requiring correction as follows: Page 1, first column, lines 41 and 42, for "ammonita" read ammonia; and second column, line 23, for "50" read 500; and that the said Letters Patent should be read with this correction therein that the same may conform to the record of the case in the Patent Office.

Signed and sealed this 6th day of June, A. D. 1939.

Henry Van Arsdale
Acting Commissioner of Patents.

(Seal)